United States Patent [19]

Barnow

[11] Patent Number: 5,105,517
[45] Date of Patent: Apr. 21, 1992

[54] METHOD FOR CONVERTING A VEHICLE TO A FREE TOWING VEHICLE

[75] Inventor: Charles A. Barnow, Whittier, Calif.

[73] Assignee: Grant & Miriam Enterprises, Inc., La Habra, Calif.

[21] Appl. No.: 348,390

[22] Filed: May 8, 1989

[51] Int. Cl.⁵ .................. B23P 19/04; B60K 17/354
[52] U.S. Cl. ................... 29/401.1; 29/402.01; 180/247; 403/300; 464/901
[58] Field of Search ................ 29/401.1, 402.01; 180/247, 249, 259; 403/300; 464/158, 160, 901; 280/211; 74/710.5, 713

[56] References Cited

U.S. PATENT DOCUMENTS

| | | | |
|---|---|---|---|
| 349,678 | 9/1886 | Applegate | 403/300 |
| 1,631,236 | 6/1927 | Werner | 464/901 X |
| 2,525,695 | 10/1950 | Lombard | 464/158 |
| 2,907,189 | 10/1959 | Flieg | 464/901 X |
| 3,315,532 | 4/1967 | Carneseca, Jr. et al. | 464/901 X |
| 4,304,317 | 12/1981 | Vanzant et al. | 180/247 |
| 4,334,590 | 6/1982 | Plumb | 180/247 |
| 4,597,312 | 7/1986 | Hicks et al. | 29/401.1 X |
| 4,745,986 | 5/1988 | Hanenberger | 29/401.1 X |

*Primary Examiner*—Joseph M. Gorski
*Assistant Examiner*—Peter Dungba Vo
*Attorney, Agent, or Firm*—Edgar W. Averill, Jr.

[57] ABSTRACT

A process for converting a motor vehicle to a free towing motor vehicle. The process includes the steps of removing an axle between the differential and one of the driven wheels and replacing it with a pair of stub axles with a connect/disconnect lock therebetween. In order to tow the vehicle, the connect/disconnect lock is moved to the unlocked position so that the driven wheels may turn freely.

4 Claims, 2 Drawing Sheets

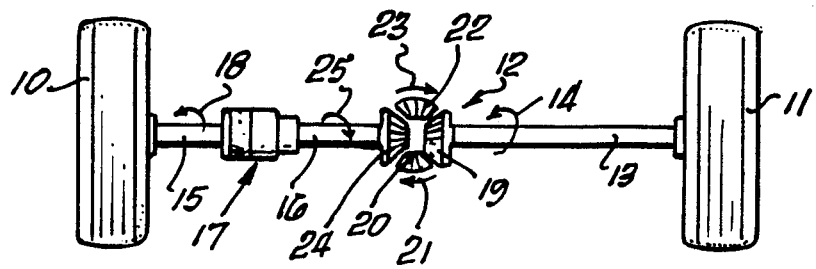
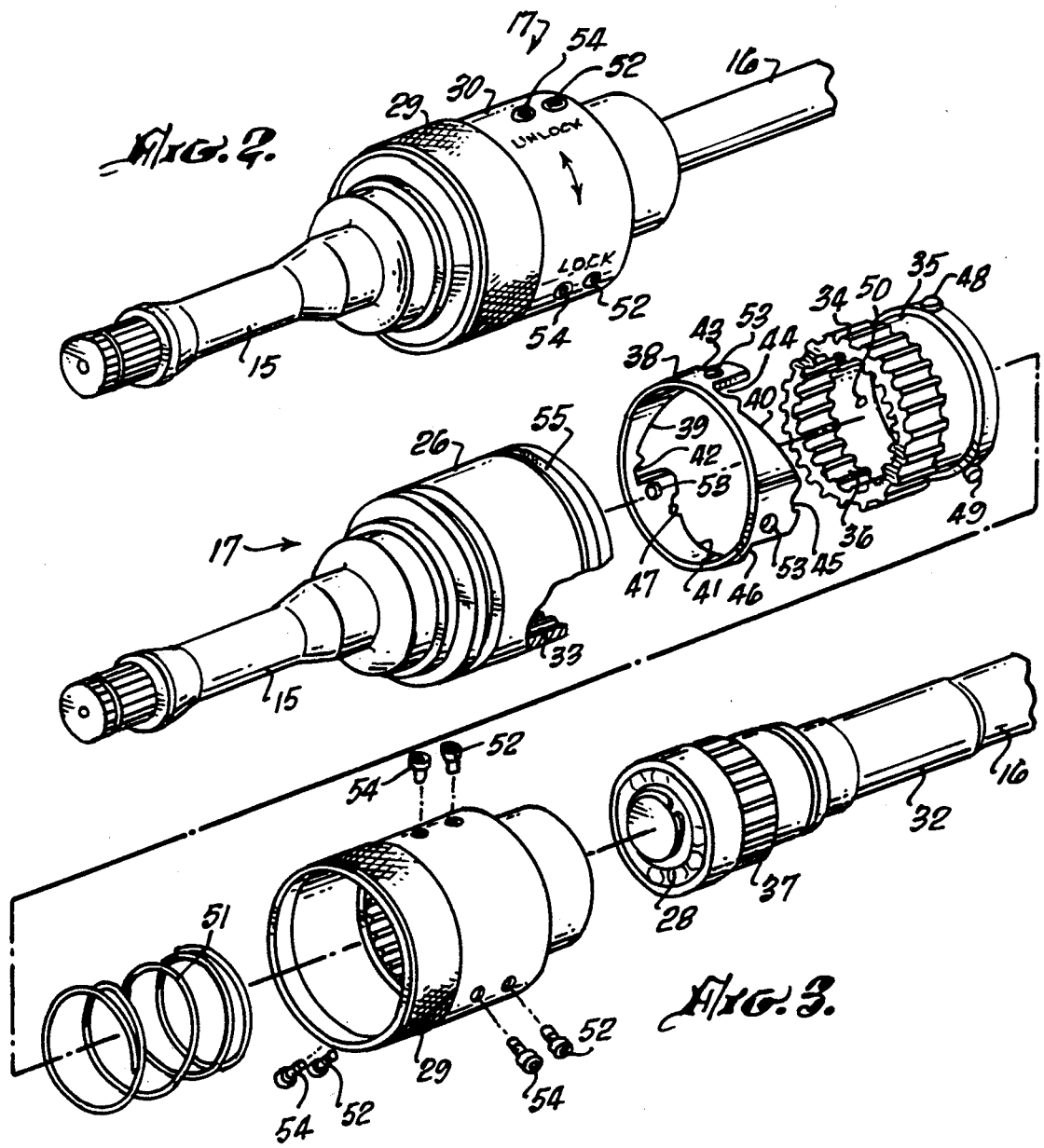

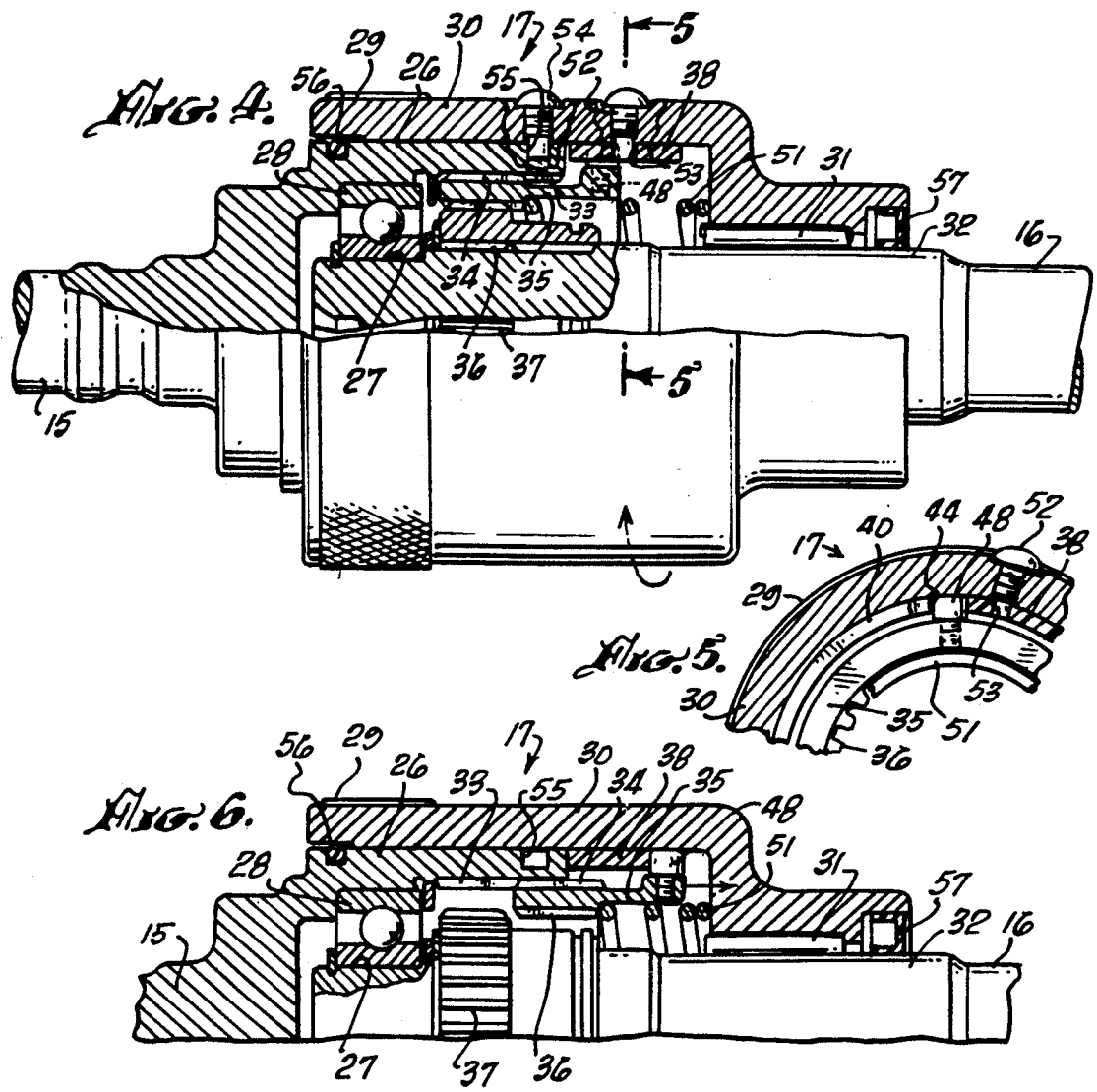

METHOD FOR CONVERTING A VEHICLE TO A FREE TOWING VEHICLE

BACKGROUND OF THE INVENTION

The field of the invention is motor vehicle accessories, and the invention relates more particularly to devices useful for towing motor vehicles.

Motor homes and other recreational vehicles are becoming more popular, but when they are parked at a campsite and connected to the various water and electrical supplies contained therein, it is convenient to have a motor vehicle which can be used for errands and side trips. Thus, it is becoming more and more popular to tow a small, typically front wheel driven motor vehicle behind a motor home or other recreational vehicle.

The typical approach is to place the motor vehicle in neutral and connect a tow bar between the recreational vehicle and the towed vehicle. Unfortunately, such connection causes the driven wheels and the transmission to rotate, and this has several disadvantages. Most transmissions are not properly lubricated when towed. Another substantial disadvantage is that the odometer logs tow miles. Thus, a vehicle which may have been driven only a few hundred miles may have been towed thousands of miles and thus quickly use up its warranty and decrease its resale value simply because it has been towed.

Another disadvantage of towing a vehicle which has been placed in neutral is that the turning of the transmission will increase the power needed to tow the vehicle and thus decrease the mileage of the recreational vehicle or other towing vehicle.

The single axle disconnect principle is utilized in four wheel drive vehicles made by GMC, Chevrolet, AMC Eagle, Dodge and Jeep and in the 1989 Toyota four wheel drive pickup. Such vehicles are converted between two wheel drive and four wheel drive by connecting or disconnecting such axles.

SUMMARY OF THE INVENTION

It is an object of the present invention to provide a process for facilitating the towing of motor vehicles.

The present invention is for a process for converting the motor vehicle to a free towing motor vehicle. Such motor vehicle is of the type which has an axle assembly including a differential, and such motor vehicles have a first axle from the differential to one driven wheel and a second axle from the differential to the second driven wheel. The process comprises the steps of removing one of the first or second axles. Next, the removed axle is replaced with an axle lock assembly comprising a wheel stub shaft affixed to a driven wheel, a connect/disconnect lock and a differential stub shaft connected between the differential and the connect/disconnect lock. The connect/disconnect lock includes external means to lock the wheel and differential stub shafts together and to unlock them and permit them to turn freely with respect to one another. Preferably, the wheel stub shaft is shorter than the differential stub shaft.

Another approach to towing a vehicle is the use of a dolly. The driven wheels of the vehicle are driven up onto a dolly which, in turn, has wheels and, thus, as the vehicle is towed, the driven wheels of the vehicle do not turn. A tow dolly is illegal in Canada and some states. The tow dolly also makes it more difficult to back up the recreational vehicle. In fact, such backing is almost impossible.

BRIEF DESCRIPTION OF THE DRAWINGS

FIG. 1 is a schematic view of two driven wheels connected to a differential having a connect/disconnect lock in the middle thereof.

FIG. 2 is a perspective view of the axle lock of the process of the present invention.

FIG. 3 is an exploded perspective view of the axle lock of FIG. 2.

FIG. 4 is a cross-sectional view of the axle lock of FIG. 2.

FIG. 5 is a cross-sectional view taken along line 5—5 of FIG. 4.

FIG. 6 is a cross-sectional view showing the axle lock of FIG. 2 in an unlocked configuration.

FIG. 7 is a perspective view of the cam and sliding gear portion of the axle lock of FIG. 2 in a locked position.

FIG. 8 is a perspective view of the cam and sliding gear of the axle lock of FIG. 2 in an unlocked configuration.

DESCRIPTION OF THE PREFERRED EMBODIMENTS

FIG. 1 shows a diagrammatic view of a pair of driven wheels 10 and 11. Wheel 11 is connected to a differential 12 by an axle 13. The direction of rotation of axle 13 in a forward direction is indicated by arrow 14. Differential 12 is normally connected to wheel 10 by an axle analogous to axle 13, that is a solid axle. In the process of the present invention, however, such solid axle is removed and replaced by the assembly shown in FIG. 1 between wheel 10 and differential 12. That assembly comprises a wheel stub shaft 15 connected to the wheel and a differential stub shaft 16 connected to the differential. Both of these stub shafts are either locked or unlocked within an axle lock 17 which is shown in FIGS. 2 through 8 of the drawings.

When axle lock 17 is unlocked and the vehicle is towed, wheel 10 rotates in a direction indicated by arrow 18, and wheel 11 rotates in a direction indicated by arrow 14. Differential side gear 19, of course, is integral with axle 13 and rotates in the direction of arrow 14. Differential pinion 20 rotates in the direction of arrow 21, and differential pinion 22 rotates in the direction of arrow 23. This drives differential side gear 24 in the direction of arrow 25. Since axle lock 17 is in an open position, differential stub shaft 16 may freely rotate in the direction of arrow 25, and wheel stub shaft 15 may freely rotate in the direction of arrow 18 since axle lock 17 operates as a free turning bearing when unlocked. Thus, the differential ring gear of the vehicle need not turn at all and, in fact because of the friction involved, in practice will not turn. The device of the present invention should be used on an open differential rather than a limited slip differential. For an open differential, only the gears shown in the drawing will turn, and the remaining differential gears and the transmission are completely inactive during towing. Thus, no mileage is registered during towing, and the transmission is not turned, thereby a lubrication problem occurring when towing in neutral does not exist.

The details of construction of the axle lock useful in the process of the present invention are shown in FIGS. 2 through 8. In FIG. 2, the wheel stub shaft 15 extends into a cup-shaped chamber 26 shown in cross-sectional view in FIGS. 4 and 6. A bearing 28 connects the cup-shaped chamber 26 to the bearing surface 27 at the end of differential stub shaft 16. A knurled ring 29 is formed on the exterior of cup 30, which cup holds a needle bearing 31 which rides on bearing surface 32 of differential stub shaft 16. A plurality of gear teeth 33 are formed on the inner surface of cup 30, and these may be meshed with the outer gear 34 on slider gear member 35. The inner teeth 36 on slider gear 35 mesh with gear teeth 37 near the end of differential stub shaft 16. Slider gear 35 is caused to turn by a cam member 38 which has three identical cam surfaces 39, 40 and 41. Cam surface 39 has a lower detent 42 and an upper detent 43. Similarly, cam surface 40 has a lower detent 44 and an upper detent 45. Cam surface 41 has a lower detent 46 and an upper detent 47. These hold three pins 48, 49 and 50 in one of two stable positions. A spring 51 urges slider gear 35 into a engaged position as shown in FIG. 4. Cup 30 is secured to cam member 38 by three screws 52 which pass into holes 53 in cam member 38. Thus, when knurled ring 29 is turned, cam member 38 turns with it. This causes the slider gear to move from the position shown in FIG. 4 to the position shown in FIG. 6. When slider gear 35 is in the position shown in FIG. 4, it engages gear 37 and gear 33. When the cam ring pulls the slider gear to the right, as shown in FIG. 6, it still connects with gear 33, but is disconnected from gear 37. Thus, shaft 16 is free to turn with respect to shaft 15. This cam action is shown best in FIGS. 7 and 8 where it can be seen that the assembly is in a stable configuration when locked in FIG. 7 and also in a stabled configuration when unlocked in FIG. 8. The unit is held in place by three screws 54 which pass into groove 55.

The assembly is permanently lubricated by being filled with oil which is retained in place by O-ring 56 and oil seal 57.

Thus, in operation, one removes the existing axle and replaces it with the axle assembly including the connect/disconnect axle lock. Thus, in order to tow the vehicle, the lock is unlocked by reaching in behind the tire and manually turning cup 30 counterclockwise. This pulls slider gear 35 out of contact with gear 37 and allows stub shafts 15 and 16 to turn freely. Then to lock the vehicle back into a driving configuration, one turns the knurled knob on cup 30 counterclockwise one-third turn thereby causing slider gear 35 to move into contact with gear 37, and the vehicle is then exactly identical to a normal vehicle. For certain vehicles including those with a positraction transmission, it is necessary to install an axle lock on each side of the differential. Some installations will be made on the left axle and others on the right axle. Occasionally, depending upon the construction of the vehicle, turning the steering wheel full right or left will allow easy access. In some vehicles, access may be easier through the engine compartment.

The result is the remarkable easy system which allows the vehicle to be towed without registering mileage or damaging the transmission. The device is also useful to prevent theft since the vehicle cannot be driven with the axle lock unlocked.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for converting a two wheel drive motor vehicle to a free towing motor vehicle, said motor vehicle being of the type which has a transmission, an odometer and an axle assembly including a differential and which has a first axle from said differential to one driven wheel and a second axle from said differential to the second driven wheel, said process comprising:
   removing one of said first and said second axles which results in a removed axle;
   replacing the removed axle with an axle lock assembly comprising a wheel stub shaft affixed to a driven wheel, a connect/disconnect lock and a differential stub shaft connected to the differential, said connect/disconnect lock having an exterior and including external means to lock the wheel and differential stub shafts together and to unlock the wheel and differential stub shafts and to permit the wheel stub shaft to rotate independently of the differential stub shaft whereby when said connect/disconnect lock is locked, the vehicle may be driven in a normal manner but when it is unlocked, the vehicle may be freely towed without turning the transmission or operating the odometer.

2. The process of claim 1 wherein said external means is a knurled ring on the exterior of said connect/disconnect lock.

3. The process of claim 1 wherein said wheel stub shaft is shorter than said differential stub shaft.

4. The process of claim 1 wherein said first and second axles are front axles.

* * * * *